US010069963B2

(12) United States Patent
Ogawa

(10) Patent No.: US 10,069,963 B2
(45) Date of Patent: Sep. 4, 2018

(54) COMMUNICATION DEVICE

(71) Applicant: Oki Data Corporation, Tokyo (JP)

(72) Inventor: Kimiaki Ogawa, Tokyo (JP)

(73) Assignee: OKI DATA CORPORATION, Tokyo (JP)

(*) Notice: Subject to any disclaimer, the term of this patent is extended or adjusted under 35 U.S.C. 154(b) by 160 days.

(21) Appl. No.: 15/185,725

(22) Filed: Jun. 17, 2016

(65) Prior Publication Data
US 2017/0064074 A1 Mar. 2, 2017

(30) Foreign Application Priority Data

Aug. 26, 2015 (JP) .................................. 2015-166376

(51) Int. Cl.
H04M 1/76 (2006.01)
H04M 3/28 (2006.01)
H04M 7/00 (2006.01)
H04M 11/06 (2006.01)
H04B 3/493 (2015.01)
H04M 19/02 (2006.01)
H04N 1/00 (2006.01)

(52) U.S. Cl.
CPC .............. H04M 1/76 (2013.01); H04B 3/493 (2015.01); H04M 3/28 (2013.01); H04M 7/0096 (2013.01); H04M 11/066 (2013.01); H04M 19/02 (2013.01); H04N 1/00206 (2013.01); H04N 1/00281 (2013.01); H04N 2201/0093 (2013.01)

(58) Field of Classification Search
CPC ... H04M 1/76; H04M 1/72577; H04N 5/3694

USPC .............. 73/290; 257/690; 326/30; 327/513; 379/27.01, 164, 202.01, 382, 391, 392.01, 379/394, 198, 377, 402, 405; 710/100; 333/33; 370/271, 278, 497; 398/158; 455/412.2, 565
See application file for complete search history.

(56) References Cited

U.S. PATENT DOCUMENTS

| 4,056,719 | A | * | 11/1977 | Waaben | H04B 3/36 250/205 |
| 4,219,701 | A | * | 8/1980 | Feiner | H04M 3/4285 370/271 |
| 4,764,922 | A | * | 8/1988 | Dieter | H04M 11/062 333/131 |
| 4,796,290 | A | * | 1/1989 | Perry | H04M 1/24 379/1.01 |
| 4,887,293 | A | * | 12/1989 | Molnar | H04M 9/007 379/164 |
| 4,996,710 | A | * | 2/1991 | Takahashi | H04M 1/58 379/202.01 |

(Continued)

FOREIGN PATENT DOCUMENTS

EP 1571816 A1 9/2005
JP 2010-171636 A 8/2010

Primary Examiner — Gerald Gauthier
(74) Attorney, Agent, or Firm — Rabin & Berdo, P.C.

(57) ABSTRACT

A communication device includes: a signal generator configured to generate a first signal and supply the first signal to a telephone line; a terminator having a variable terminal impedance as seen from the telephone line; a detector configured to detect a difference between the terminal impedance and a line impedance of the telephone line; and a controller configured to determine the terminal impedance so that the difference is reduced.

12 Claims, 14 Drawing Sheets

(56) References Cited

U.S. PATENT DOCUMENTS

| | | | | |
|---|---|---|---|---|
| 5,133,007 | A * | 7/1992 | Nishimura | H04M 1/58 379/391 |
| 5,398,282 | A * | 3/1995 | Forrester | H04M 1/585 379/391 |
| 5,402,485 | A * | 3/1995 | Takato | H04M 3/005 379/345 |
| 5,706,342 | A * | 1/1998 | Baeder | H04M 1/82 379/194 |
| 6,556,673 | B1 * | 4/2003 | Davis | H04M 1/82 379/373.01 |
| 6,904,144 | B1 * | 6/2005 | Patel | H04M 1/76 379/394 |
| 7,408,379 | B2 * | 8/2008 | Cho | G11C 29/028 326/30 |
| 8,526,585 | B2 | 9/2013 | Nakazawa | |
| 8,687,785 | B2 * | 4/2014 | Katkam | H04M 3/42323 379/188 |
| 8,774,771 | B2 * | 7/2014 | Imaeda | H04M 1/663 455/412.2 |
| 9,332,115 | B2 * | 5/2016 | Imaeda | H04M 1/72577 |
| 9,774,807 | B2 * | 9/2017 | Asaba | H04N 5/3694 |
| 2001/0005868 | A1 * | 6/2001 | Muljono | G06F 13/4086 710/100 |
| 2002/0190746 | A1 * | 12/2002 | Abrosimov | H04L 25/0278 326/30 |
| 2003/0091181 | A1 * | 5/2003 | Martin | H04M 1/68 379/392.01 |
| 2003/0112054 | A1 * | 6/2003 | Yamaguchi | H03F 1/306 327/513 |
| 2004/0104785 | A1 * | 6/2004 | Park | H01P 1/185 333/33 |
| 2005/0248022 | A1 * | 11/2005 | Badr | H01L 23/66 257/690 |
| 2009/0109880 | A1 * | 4/2009 | Kim | H04B 1/50 370/278 |
| 2012/0137767 | A1 * | 6/2012 | Silvermint | G01F 23/284 73/290 R |
| 2017/0064074 | A1 * | 3/2017 | Ogawa | H04M 3/28 |

* cited by examiner

FIG. 7

|  | R1 | R2 | R3 | C1 |
|---|---|---|---|---|
| TERMINAL CIRCUIT 61 | 600 Ω | – | – | – |
| TERMINAL CIRCUIT 62 | – | 270 Ω | 750 Ω | 150nF |
| TERMINAL CIRCUIT 63 | – | 220 Ω | 820 Ω | 115nF |
| TERMINAL CIRCUIT 64 | – | 220 Ω | 820 Ω | 120nF |
| TERMINAL CIRCUIT 65 | – | 370 Ω | 620 Ω | 310nF |
| TERMINAL CIRCUIT 66 | – | 220 Ω | 820 Ω | 115nF |

FIG. 12A IMPEDANCE SWITCHING INSTRUCTION UNIT 37

FIG. 12B FREQUENCY SETTER 31

FIG. 12C TONE GENERATOR 43

FIG. 12D OUTPUT SIGNAL OF COMPARATOR 46

FIG. 12E IMPEDANCE DETERMINER 38

COMMUNICATION DEVICE

BACKGROUND OF THE INVENTION

1. Field of the Invention

The present invention relates to a communication device for communication via a telephone line.

2. Description of the Related Art

Communication devices, such as telephones or facsimile machines, communicate with communication partners via telephone lines. There are multiple telephone line standards in the world, and the standards specify different line impedances of telephone lines. The terminal impedance of a communication device as seen from a telephone line is often set to a value corresponding to the line impedance of the telephone line (e.g., Japanese Patent Application Publication No. 2010-171636).

However, the communication quality of a communication device may be degraded.

SUMMARY OF THE INVENTION

An aspect of the present invention is intended to improve communication quality.

According to an aspect of the present invention, there is provided a communication device including: a signal generator configured to generate a first signal and supply the first signal to a telephone line; a terminator having a variable terminal impedance as seen from the telephone line; a detector configured to detect a difference between the terminal impedance and a line impedance of the telephone line; and a controller configured to determine the terminal impedance so that the difference is reduced.

With this configuration, communication quality can be improved.

BRIEF DESCRIPTION OF THE DRAWINGS

In the attached drawings:

FIG. 7 is a table illustrating an exemplary configuration of the terminator in FIG. 6;

DETAILED DESCRIPTION OF THE INVENTION

Embodiments of the present invention will now be described with reference to the drawings.

First Embodiment

<Configuration Example>

Figure 1:
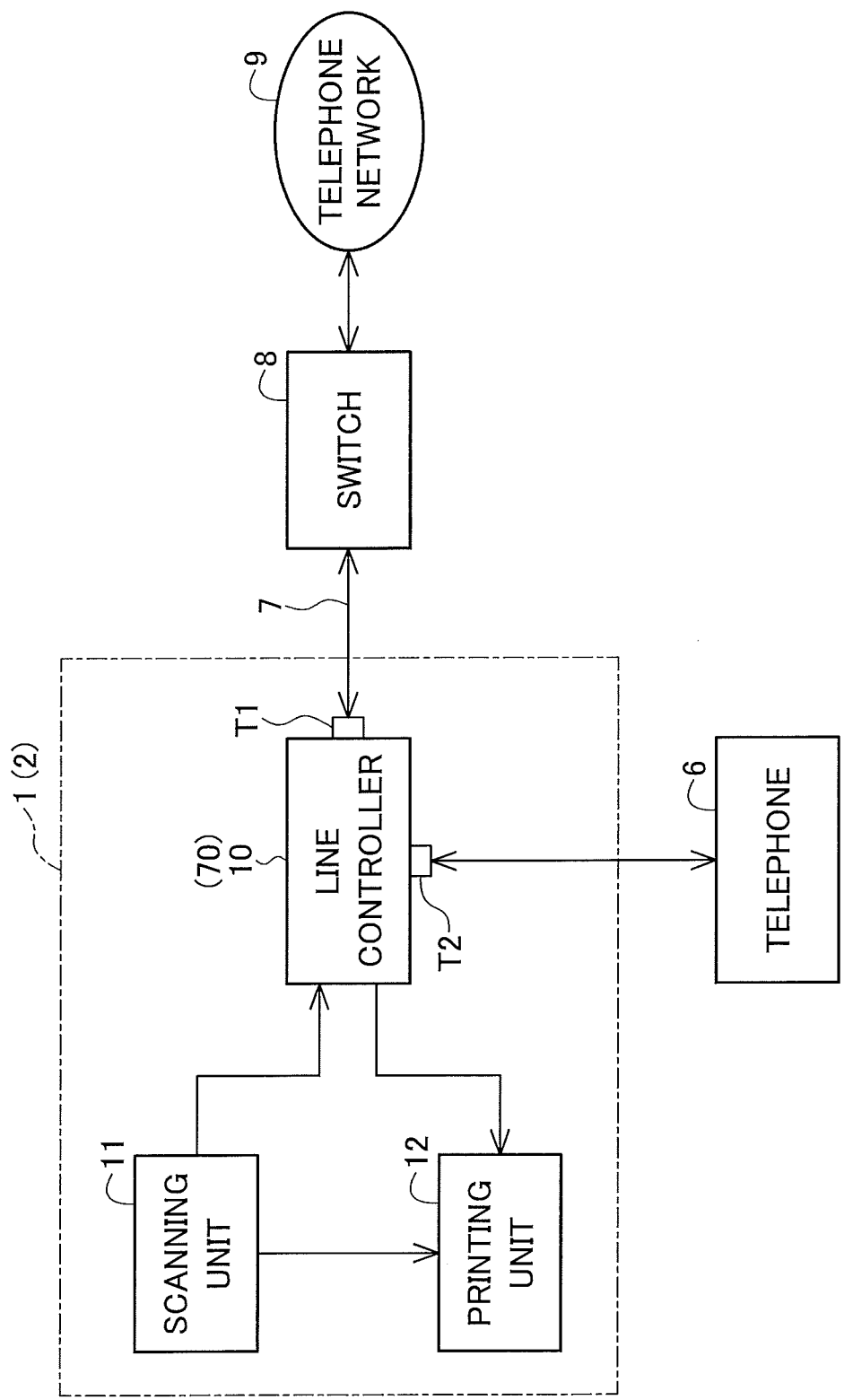
FIG. 1 is a block diagram illustrating an exemplary configuration of a communication device according to a first embodiment of the present invention.

FIG. 1 illustrates an exemplary configuration of a communication device 1 according to a first embodiment of the present invention. The communication device 1 is a multi-function peripheral (MFP) having functions, such as copying, facsimile, and scanning. The communication device 1 includes a scanning unit (or scanner) 11, printing unit (or printer) 12, and a line controller 10.

The scanning unit 11 reads information, such as characters or graphics, printed on, for example, a document to generate image data. Further, when the communication device 1 functions as a copier, the scanning unit 11 supplies the generated image data to the printing unit 12; when the communication device 1 functions as a facsimile machine, the scanning unit 11 supplies the generated image data to the line controller 10.

The printing unit 12 prints image data supplied from the scanning unit 11 or line controller 10 on a recording medium, such as a paper sheet.

The line controller 10 controls a telephone line. The line controller 10 has connectors T1 and T2. The connector T1 is connected to a switch 8 via a telephone line 7, and the connector T2 is connected to a telephone 6. The line controller 10 transmits a data signal including image data supplied from the scanning unit 11, to a communication partner connected to a telephone network 9, via the telephone line 7 and switch 8. The line controller 10 also receives a data signal including image data from a communication partner via the switch 8 and telephone line 7, and supplies the received data signal to the printing unit 12. Further, the line controller 10 has a function of controlling communication of audio signals between the telephone 6 and another telephone connected to the telephone network 9.

Figure 2:
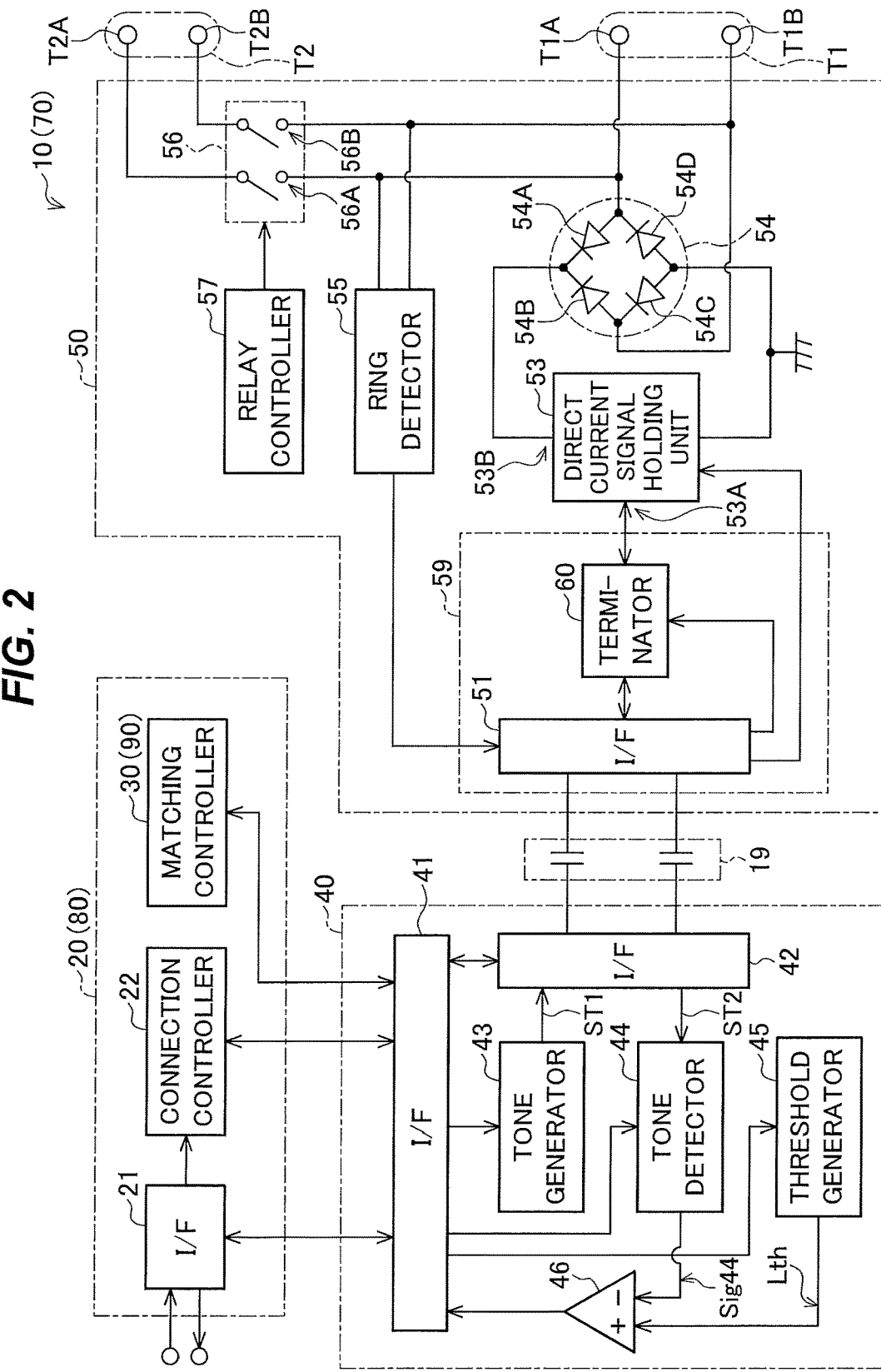
FIG. 2 is a block diagram illustrating an exemplary configuration of a line controller in FIG. 1.

FIG. 2 illustrates an exemplary configuration of the line controller 10. The line controller 10 includes a communication controller 20, a modem 40, and a line interface 50.

The communication controller 20 controls communication of the communication device 1. The communication controller 20 includes an interface (I/F) 21, a connection controller 22, and a matching controller 30.

The interface 21 is an interface with the scanning unit 11 and printing unit 12. Specifically, the interface 21 receives a data signal from the scanning unit 11, supplies the data signal to the modem 40, and notifies the connection controller 22 that a data signal is to be transmitted. The interface 21 also receives a data signal from the modem 40 and supplies the data signal to the printing unit 12.

The connection controller 22 controls operation of a direct current signal holding unit 53 (described later) of the line interface 50, thereby performing a line connection operation or a line disconnection operation. Specifically, when the connection controller 22 receives from the interface 21 a notification that a data signal is to be transmitted, it supplies a control signal to the direct current signal holding unit 53 via the modem 40 and an interface 51 (described later) of the line interface 50, thereby starting operation of the direct current signal holding unit 53. Thereby, the communication device 1 is electrically connected to the telephone line 7. Also, when the connection controller 22 receives, from a ring detector 55 (described later) of the line interface 50 via the interface 51 and modem 40, a notification that a ring signal has been detected, it supplies a control signal to the direct current signal holding unit 53 via the modem 40 and interface 51, thereby starting operation of the direct current signal holding unit 53. Thereby, the communication device 1 is electrically connected to the telephone line 7. Also, when the communication device 1 terminates communication of a data signal, the connection controller 22 supplies a control signal to the direct current signal holding unit 53 via the modem 40 and interface 51, thereby stopping operation of the direct current signal holding unit 53. Thereby, the communication device 1 is electrically disconnected from the telephone line 7.

The matching controller 30 determines a terminal impedance of the communication device 1 so that the difference (or impedance difference) between the terminal impedance and a line impedance of the telephone line 7 is reduced (or small).

Figure 3:
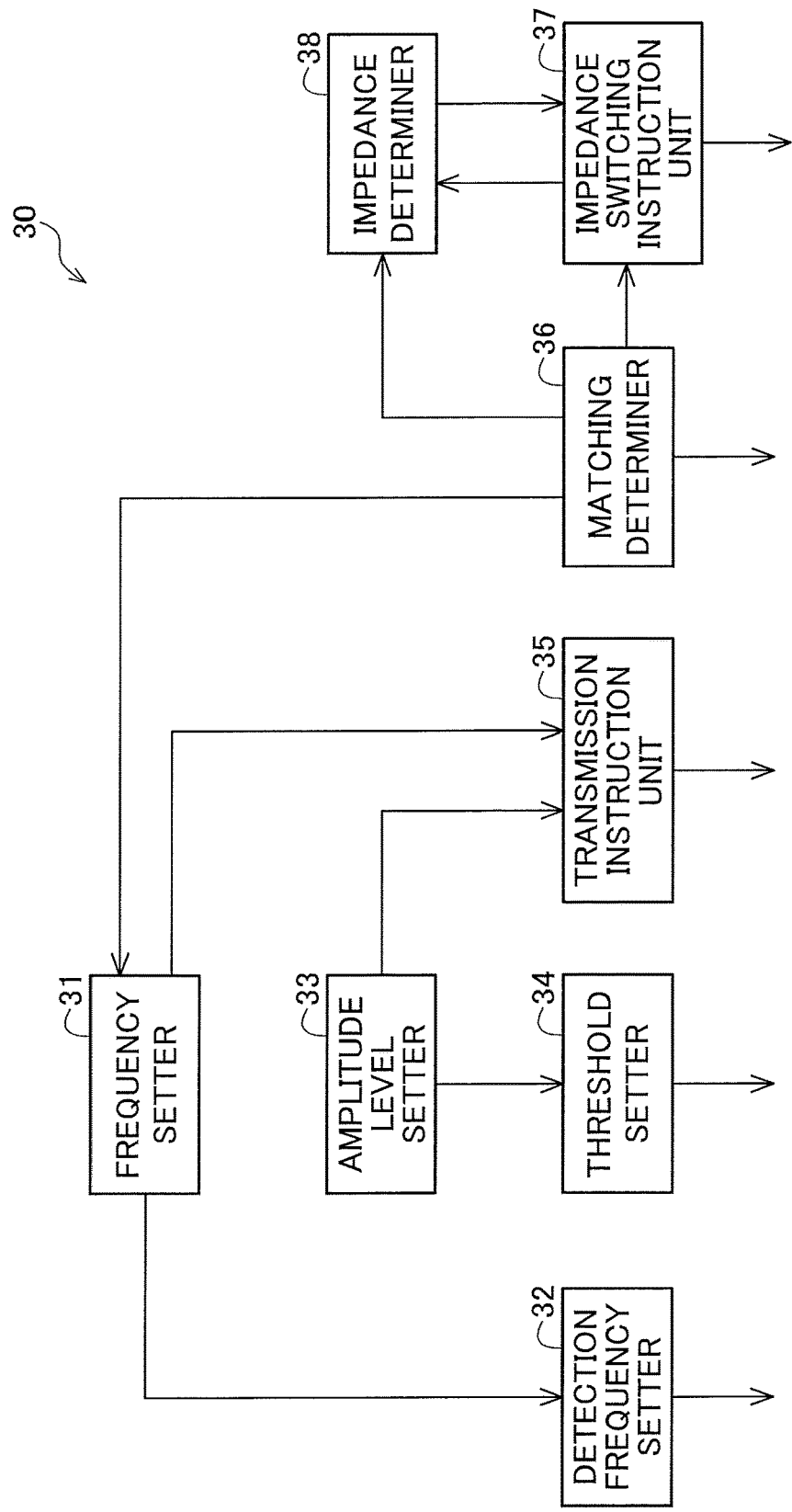
FIG. 3 is a block diagram illustrating an exemplary configuration of a matching controller of the first embodiment.

FIG. 3 illustrates an exemplary configuration of the matching controller 30. The matching controller 30 includes a frequency setter 31, a detection frequency setter 32, an amplitude level setter 33, a threshold setter 34, a transmission instruction unit 35, a matching determiner 36, an impedance switching instruction unit 37, and an impedance determiner 38.

The frequency setter 31 sets the frequency of a tone signal ST1 generated by a tone generator 43 (described later) of the modem 40. Specifically, the frequency setter 31 supplies a control signal to the tone generator 43 via the transmission instruction unit 35 and an interface 41 (described later) of the modem 40, thereby setting the frequency of the tone signal ST1. At this time, based on determination by the matching determiner 36, the frequency setter 31 sequentially sets (or varies) the frequency of the tone signal ST1 within a frequency range from a minimum frequency fmin (e.g., 300 [Hz]) to a maximum frequency fmax (e.g., 4000 [Hz]). Specifically, the frequency setter 31 sequentially sets (or varies) the frequency of the tone signal ST1 within the frequency range from the minimum frequency fmin to the maximum frequency fmax but outside a predetermined frequency range including the frequency (e.g., 400 [Hz]) of a dial tone signal transmitted by the switch 8 as described later. The frequency setter 31 also has a function of notifying the detection frequency setter 32 of the set frequency.

The detection frequency setter 32 sets a frequency range (referred to below as a detection frequency range) within which detection is to be performed by a tone detector 44 (described later) of the modem 40. Specifically, the detection frequency setter 32 supplies a control signal to the tone detector 44 via the interface 41 (described later) of the modem 40, thereby setting the detection frequency range. At this time, the detection frequency setter 32 sets the detection frequency range on the basis of the frequency of the tone signal ST1 set by the frequency setter 31.

The amplitude level setter 33 sets an amplitude level of the tone signal ST1 generated by the tone generator 43 (described later) of the modem 40. Specifically, the amplitude level setter 33 supplies a control signal to the tone generator 43 via the transmission instruction unit 35 and the interface 41 (described later) of the modem 40, thereby setting the amplitude level of the tone signal ST1. The amplitude level setter 33 also has a function of notifying the threshold setter 34 of the set amplitude level of the tone signal ST1.

The threshold setter 34 sets a threshold level Lth generated by a threshold generator 45 (described later) of the modem 40. Specifically, the threshold setter 34 supplies a control signal to the threshold generator 45 via the interface 41 (described later) of the modem 40, thereby setting the threshold level Lth. At this time, the threshold setter 34 sets the threshold level Lth on the basis of the amplitude level of the tone signal ST1 set by the amplitude level setter 33.

The transmission instruction unit 35 instructs the tone generator 43 (described later) of the modem 40 to generate and transmit a tone signal ST1 in accordance with instructions from the frequency setter 31 and amplitude level setter 33. Specifically, the transmission instruction unit 35 supplies a control signal to the tone generator 43 via the interface 41 (described later) of the modem 40, thereby instructing the tone generator 43 to generate and transmit a tone signal ST1.

The matching determiner 36 determines, based on comparison by a comparator (described later) 46 of the modem 40, whether impedances match. Specifically, the matching determiner 36 determines, based on a result of comparison by the comparator 46 supplied via the interface 41 (described later) of the modem 40, whether the impedances match. The matching determiner 36 then notifies the frequency setter 31 and impedance determiner 38 of the result of the determination.

The impedance switching instruction unit 37 instructs a terminator 60 (described later) of the line interface 50 to switch a terminal impedance. Specifically, the impedance switching instruction unit 37 supplies a control signal to the terminator 60 via the modem 40, an insulator 19 (described later), and the interface 51 (described later) of the line interface 50, thereby setting the terminal impedance. The impedance switching instruction unit 37 also has a function of notifying the impedance determiner 38 of the setting of the terminal impedance in the terminator 60. Further, the impedance switching instruction unit 37 has a function of receiving a result of determination of the terminal impedance by the impedance determiner 38 and setting the terminal impedance of the terminator 60 in accordance with the result of determination.

The impedance determiner 38 determines the terminal impedance to be used, on the basis of determination by the matching determiner 36 and the setting of the terminal impedance supplied from the impedance switching instruction unit 37. The impedance determiner 38 supplies the result of the determination to the impedance switching instruction unit 37.

The modem 40 (FIG. 2) includes the interface (I/F) 41, an interface (I/F) 42, the tone generator 43, the tone detector 44, the threshold generator 45, and the comparator 46.

The interface 41 functions as an interface with the communication controller 20. The interface 42 functions as an interface with the line interface 50, and is connected to the line interface 50 via the insulator 19.

The tone generator 43 generates a tone signal ST1 in accordance with an instruction from the transmission instruction unit 35. Specifically, the tone generator 43 generates, based on a control signal supplied from the transmission instruction unit 35 of the communication controller 20 via the interface 41, a tone signal ST1 having a frequency designated by the frequency setter 31 and an amplitude level designated by the amplitude level setter 33.

The tone detector 44 detects a tone signal ST2 on the telephone line 7. In particular, as described later, when the tone generator 43 transmits a tone signal ST1, the tone detector 44 detects a tone signal ST2 that is a returned signal caused by reflection of the tone signal ST1. The tone detector 44 generates a signal Sig44 corresponding to the amplitude level of the tone signal ST2.

Figure 4:
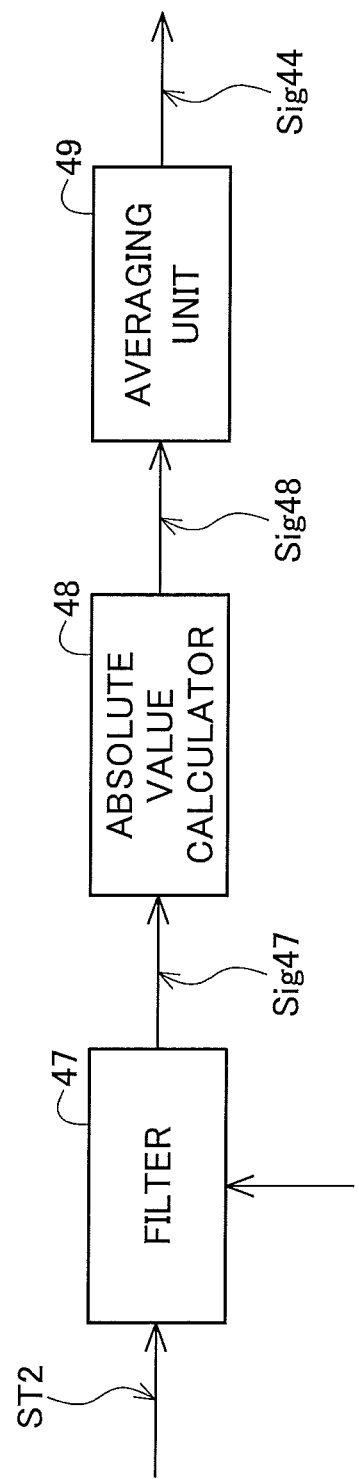
FIG. 4 is a block diagram illustrating an exemplary configuration of a tone detector in FIG. 2.
Figure 5:
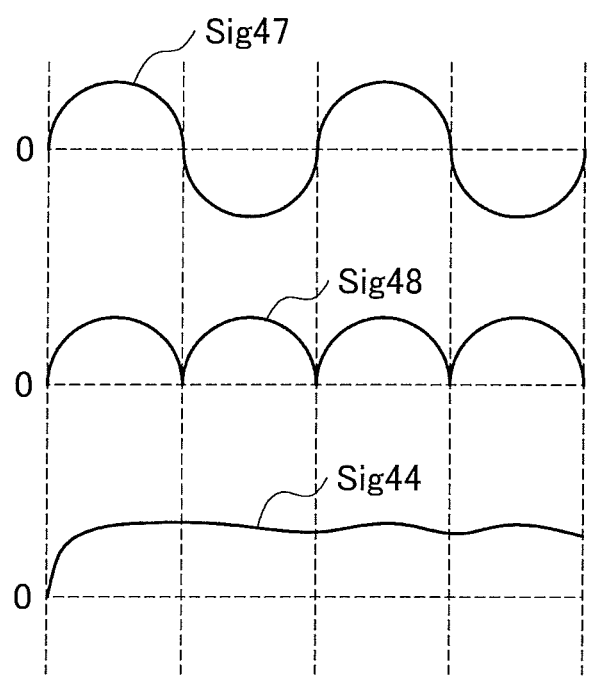
FIG. 5 is a waveform chart illustrating an exemplary operation of the tone detector in FIG. 4.

FIG. 4 illustrates an exemplary configuration of the tone detector 44. FIG. 5 is a diagram for explaining an exemplary operation of the tone detector 44. The tone detector 44 includes a filter 47, an absolute value calculator 48, and an averaging unit 49.

The filter 47 generates a digital signal by performing analog-to-digital (AD) conversion on a tone signal ST2 at a predetermined sampling rate, and generates a signal Sig47 by performing filtering processing on the digital signal. The filter 47 is configured using, for example, an infinite impulse response (IIR) digital filter. The filter coefficients of the filter 47 are set based on a control signal supplied from the detection frequency setter 32 of the communication controller 20 via the interface 41. Thereby, the filter 47 allows a signal component within the detection frequency range set by the detection frequency setter 32 to pass therethrough and attenuates the signal component outside the detection frequency range.

The absolute value calculator 48 generates a signal Sig48 by calculating an absolute value of the signal Sig47 supplied from the filter 47. The averaging unit 49 generates a signal Sig44 by averaging the signal Sig48 output from the absolute value calculator 48.

With this configuration, the tone detector 44 generates the signal Sig44 corresponding to the amplitude level of the tone signal ST2 caused by the reflection, as illustrated in FIG. 5.

The threshold generator 45 (FIG. 2) generates a threshold level Lth in accordance with a control signal supplied from the threshold setter 34 of the communication controller 20 via the interface 41.

The comparator 46 compares the signal Sig44 output from the tone detector 44 with the threshold level Lth. If the signal Sig44 is less than the threshold level Lth, the comparator 46 outputs a high (H) level signal; if the signal Sig44 is greater than the threshold level Lth, the comparator 46 outputs a low (L) level signal. The comparator 46 supplies the result of the comparison to the matching determiner 36 of the matching controller 30 via the interface 41.

The insulator 19 insulates the modem 40 and line interface 50 from each other in terms of direct current and connects them to each other in terms of alternating current.

The line interface 50 includes the interface (I/F) 51, the terminator 60, the direct current signal holding unit 53, a diode bridge 54, the ring detector 55, a relay unit 56, and a relay controller 57.

The interface 51 functions as an interface with the modem 40, and is connected to the modem 40 via the insulator 19.

The terminator 60 terminates the telephone line 7. The terminator 60 is configured so that it can change a terminal impedance as seen from the telephone line 7 in accordance with a control signal supplied from the impedance switching instruction unit 37 of the communication controller 20 via the modem 40 and interface 51.

Figure 6:
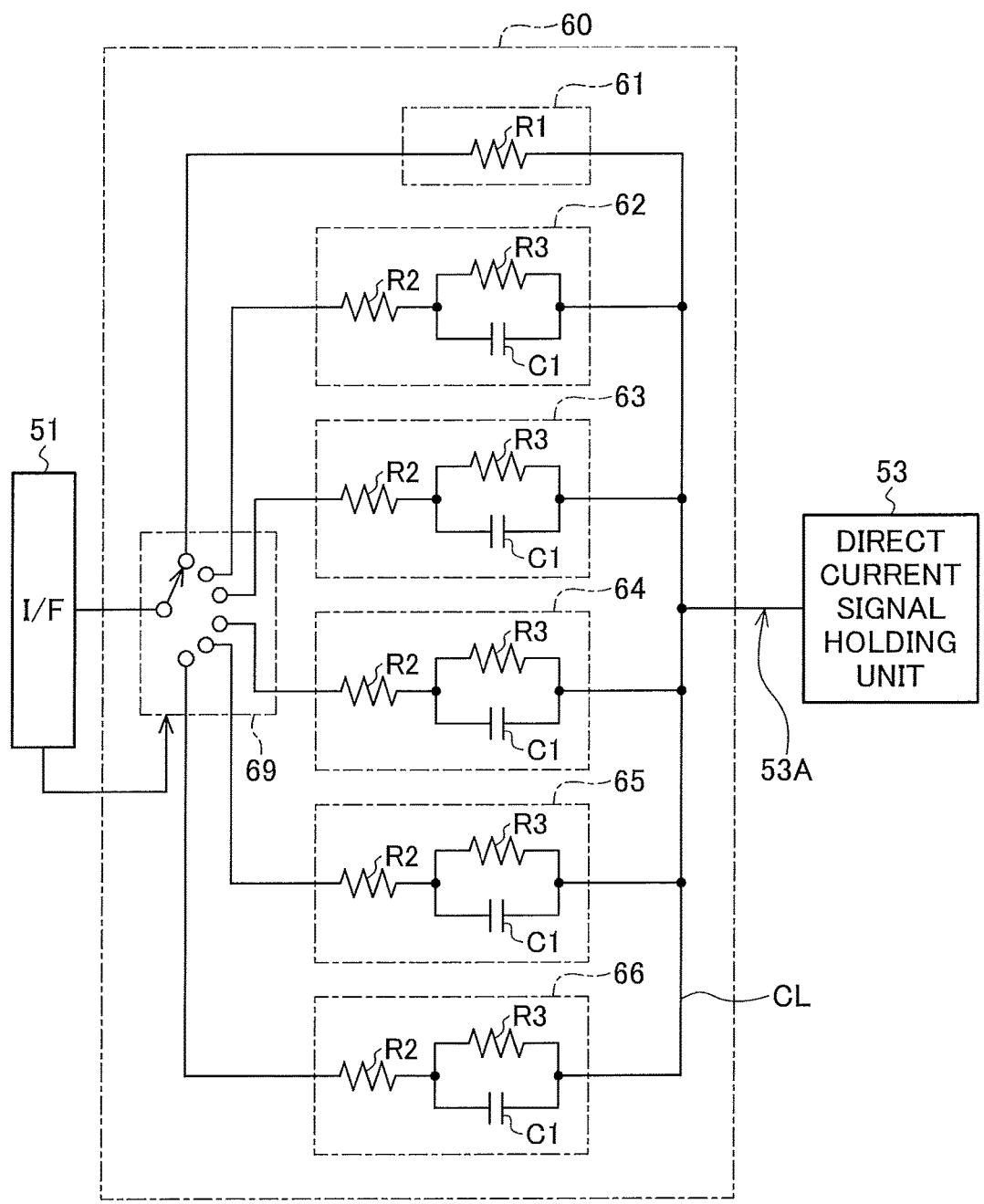
FIG. 6 is a circuit diagram illustrating an exemplary configuration of a terminator in FIG. 2.

FIG. 6 illustrates an exemplary configuration of the terminator 60. FIG. 6 depicts the interface 51 and direct current signal holding unit 53 in addition to the terminator 60. The terminator 60 includes a switch 69 and six terminal circuits 61 to 66.

The switch 69 connects the interface 51 to one end of one of the six terminal circuits 61 to 66 in accordance with a control signal supplied from the impedance switching instruction unit 37 of the communication controller 20 via the modem 40 and interface 51.

The terminal circuits 61 to 66 function as a terminal impedance of the communication device 1. Specifically, the terminal circuits 61 to 66 have different impedances; one of the terminal circuits 61 to 66 is selected by the switch 69, so that the selected terminal circuit functions as the terminal impedance.

The terminal circuit 61 includes a resistive element (or resistor) R1. A first end of the resistive element R1 is connected to a terminal of the switch 69 corresponding to the terminal circuit 61, and a second end of the resistive element R1 is connected to a common line CL and a first terminal 53A of the direct current signal holding unit 53. All of the terminal circuits 61 to 66 are connected to the common line CL.

Each of the terminal circuits 62 to 66 includes resistive elements (or resistors) R2 and R3 and a capacitive element (or capacitor) C1. For each of the terminal circuits 62 to 66, a first end of the resistive element R2 is connected to a terminal of the switch 69 corresponding to the terminal circuit, and a second end of the resistive element R2 is connected to a first end of the resistive element R3 and a first end of the capacitive element C1; the first end of the resistive element R3 is connected to the second end of the resistive element R2 and the first end of the capacitive element C1, and a second end of the resistive element R3 is connected to a second end of the capacitive element C1, the common line CL, and the first terminal 53A of the direct current signal holding unit 53; the first end of the capacitive element C1 is connected to the second end of the resistive element R2 and the first end of the resistive element R3, and the second end of the capacitive element C1 is connected to the second end of the resistive element R3, the common line CL, and the first terminal 53A of the direct current signal holding unit 53.

FIG. 7 illustrates an exemplary set of the resistance values of the resistive elements R1 to R3 and the capacitance values of the capacitive elements C1 in the terminal circuits 61 to 66. In this example, the terminal circuit 61 is selected in connecting to a telephone line in Japan or the United States of America, for example; the terminal circuit 62 is selected in connecting to a telephone line in European countries, for example; one of the terminal circuits 63 and 64 is selected in connecting to a telephone line in Australia, for example; the terminal circuit 65 is selected in connecting to a telephone line in New Zealand, for example; the terminal circuit 66 is selected in connecting to a telephone line in South African Republic, for example.

The terminator 60 and interface 51 can be configured by a silicon data access arrangement (DAA), for example.

The direct current signal holding unit 53 (FIG. 2) holds a direct current component included in a signal supplied from the telephone line 7 via the diode bridge 54. The first terminal 53A of the direct current signal holding unit 53 is connected to the terminator 60, and a second terminal 53B of the direct current signal holding unit 53 is connected to the cathodes (described later) of diodes 54A and 54B in the diode bridge 54. When the communication device 1 receives a data signal supplied from a communication partner via the telephone line 7, the direct current signal holding unit 53 holds a direct current component included in a signal supplied from the diode bridge 54 and supplies an alternating current component included in the signal to the modem 40 via the terminator 60. Also, when the communication device 1 transmits a data signal to a communication partner via the telephone line 7, the direct current signal holding unit 53 superposes an alternating current component supplied from the modem 40 via the terminator 60 on a direct current component held by the direct current signal holding unit 53 and supplies the signal obtained by the superposition to the diode bridge 54.

The direct current signal holding unit 53 also has a function of starting or stopping the operation of holding the direct current component in accordance with a control signal supplied from the connection controller 22 of the communication controller 20 via the modem 40 and interface 51.

The diode bridge 54 includes the diodes 54A and 54B and diodes 54C and 54D. The anode of the diode 54A is connected to the cathode of the diode 54D, and the cathode of the diode 54A is connected to the cathode of the diode 54B. The anode of the diode 54B is connected to the cathode of the diode 54C, and the cathode of the diode 54B is connected to the cathode of the diode 54A. The anode of the diode 54C is connected to the anode of the diode 54D, and the cathode of the diode 54C is connected to the anode of the diode 54B. The anode of the diode 54D is connected to the anode of the diode 54C, and the cathode of the diode 54D is connected to the anode of the diode 54A. The anode of the diode 54A and the cathode of the diode 54D are connected to a first terminal T1A of the connector T1, and the anode of the diode 54B and the cathode of the diode 54C are connected to a second terminal T1B of the connector T1. The cathodes of the diodes 54A and 54B are connected to the second terminal 53B of the direct current signal holding unit 53, and the anodes of the diodes 54C and 54D are connected to ground.

With this configuration, in the diode bridge 54, for example, when the voltage at the first terminal T1A of the connector T1 is higher than the voltage at the second terminal T1B, the diodes 54A and 54C are on and the diodes 54B and 54D are off, so that a positive voltage is supplied to the second terminal 53B of the direct current signal holding unit 53. Also, in the diode bridge 54, for example, when the voltage at the second terminal T1B of the connector T1 is higher than the voltage at the first terminal T1A, the diodes 54B and 54D are on and the diodes 54A and 54C are off, so that a positive voltage is supplied to the second terminal 53B of the direct current signal holding unit 53. As such, in both cases, a positive voltage is supplied to the second terminal 53B of the direct current signal holding unit 53. The direct current signal holding unit 53 holds this voltage.

The ring detector 55 detects a ring signal on the basis of a signal on the telephone line 7. The ring detector 55 supplies a control signal to the connection controller 22 via the interface 51 and modem 40, thereby notifying it that a ring signal has been detected.

The relay unit 56 connects and disconnects the telephone 6 to and from the telephone line 7 in accordance with an instruction from the relay controller 57. The relay unit 56 includes two relays 56A and 56B. The relay 56A connects and disconnects a first terminal T2A of the connector T2 to and from the first terminal T1A of the connector T1 in accordance with an instruction from the relay controller 57, and the relay 56B connects and disconnects a second terminal T2B of the connector T2 to and from the second terminal T1B of the connector T1 in accordance with an instruction from the relay controller 57.

The relay controller 57 instructs the relay unit 56 to connect or disconnect the telephone 6 to or from the telephone line 7.

The tone generator 43 is an example of a "signal generator" of the present invention. The tone detector 44, threshold generator 45, and comparator 46 are an example of a "detector" of the present invention. The matching controller 30 is an example of a "controller" of the present invention. The tone signal ST1 is an example of a "first signal" of the present invention. The tone signal ST2 is an example of a "second signal" of the present invention.

<Operation and effect>

Next, the operation and effect of the communication device 1 according to this embodiment will be described.

(Overall Schematic Operation)

First, the overall schematic operation of the communication device 1 will be described with reference to FIG. 2.

When the communication device 1 transmits image data generated by the scanning unit 11 to a communication partner via the telephone line 7, the interface 21 first notifies, based on a data signal supplied from the scanning unit 11, the connection controller 22 that the data signal is to be transmitted. Then, the connection controller 22 starts operation of the direct current signal holding unit 53, so that the communication device 1 is electrically connected to the telephone line 7. Then, the matching controller 30 determines the terminal impedance so that the difference between the terminal impedance of the communication device 1 and the line impedance of the telephone line 7 is reduced (or is small). Then, the interface 21 supplies the modem 40 with the data signal received from the scanning unit 11. Then, the modem 40 transmits the data signal to the communication partner via the line interface 50 and telephone line 7. After that, when the modem 40 finishes transmitting the data signal, the connection controller 22 stops operation of the direct current signal holding unit 53, so that the communication device 1 is electrically disconnected from the telephone line 7.

When the communication device 1 receives image data supplied from a communication partner via the telephone line 7, the ring detector 55 first detects a ring signal on the basis of a signal appearing on the telephone line 7 and notifies the connection controller 22 that a ring signal has been detected. Then, the connection controller 22 supplies a control signal to the direct current signal holding unit 53 via the modem 40 and interface 51 to start operation of the direct current signal holding unit 53, so that the communication device 1 is electrically connected to the telephone line 7. Then, the matching controller 30 determines the terminal impedance so that the difference between the terminal impedance of the communication device 1 and the line impedance of the telephone line 7 is reduced (or small). Then, the modem 40 receives a data signal transmitted from the communication partner via the telephone line 7 and line interface 50, and supplies the data signal to the interface 21. Then, the interface 21 supplies the data signal to the printing unit 12. After that, when the modem 40 finishes receiving the data signal, the connection controller 22 stops operation of the direct current signal holding unit 53, so that the communication device 1 is electrically disconnected from the telephone line 7.

(Detailed Operation of Matching Controller 30)

When the communication device 1 is electrically connected to the telephone line 7, first, a dial tone signal is transmitted from the switch 8. Then, the matching controller 30 determines the terminal impedance so that the difference between the terminal impedance of the communication device 1 and the line impedance of the telephone line 7 is reduced (or small). This operation will be described in detail below.

Figure 8:
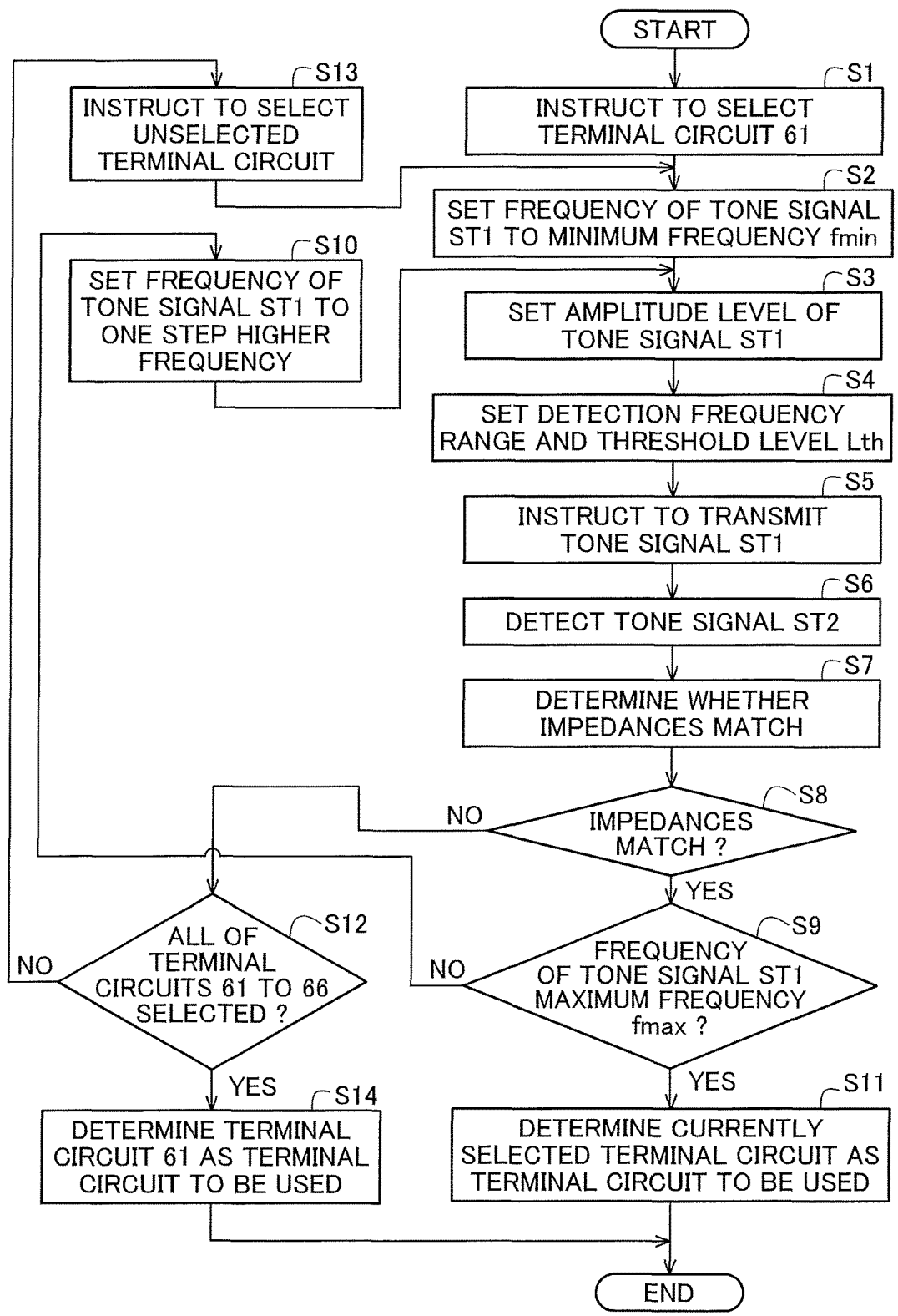
FIG. 8 is a flowchart illustrating an exemplary operation of the communication device according to the first embodiment.

FIG. 8 illustrates an exemplary operation of the communication device 1 in determining the terminal impedance. In this example, while the terminator 60 sequentially changes the terminal impedance and the tone generator 43 sequentially varies the frequency of the tone signal ST1, the tone generator 43 transmits the tone signal ST1, the tone detector 44 detects the tone signal (returned signal) ST2, and the matching controller 30 determines the terminal impedance on the basis of the amplitude level of the tone signal ST2. This operation will be described in detail below.

First, the impedance switching instruction unit 37 of the matching controller 30 instructs the terminator 60 to select the terminal circuit 61 (step S1).

Next, the frequency setter 31 sets the frequency of the tone signal ST1 to the minimum frequency fmin (e.g., 300 [Hz]) (step S2).

Next, the amplitude level setter 33 sets the amplitude level of the tone signal ST1 (step S3). In this example, the amplitude level setter 33 sets the amplitude level of the tone signal ST1 to, for example, −10 [dBm].

Next, the detection frequency setter 32 sets the detection frequency range, and the threshold setter 34 sets the threshold level Lth (step S4). In this example, the detection frequency setter 32 sets the detection frequency range to a frequency range of ±10 [Hz] from the frequency of the tone signal ST1 set by the frequency setter 31; the threshold setter 34 sets the threshold level Lth to a value (e.g., −30 [dB]) that is 20 [dB] lower than the amplitude level set by the amplitude level setter 33.

Next, the transmission instruction unit 35 instructs the tone generator 43 to transmit a tone signal ST1 (step S5). Thereby, the tone generator 43 generates a tone signal ST1 having the frequency designated by the frequency setter 31 and the amplitude level designated by the amplitude level setter 33, and transmits the tone signal ST1.

Next, the tone detector 44 detects the tone signal ST2, which is a reflected and returned signal (step S6). The tone detector 44 generates a signal Sig44 corresponding to the amplitude level of the tone signal ST2. The comparator 46 compares the signal Sig44 output from the tone detector 44 with the threshold level Lth. If the signal Sig44 is less than the threshold level Lth the comparator 46 outputs a high (H) level signal; if the signal Sig44 is greater than the threshold level Lth, the comparator 46 outputs a low (L) level signal.

Next, the matching determiner 36 determines, based on the result of the comparison supplied from the comparator 46, whether the impedances match (step S7). Specifically, if the output signal of the comparator 46 is at a high level, the amplitude level of the tone signal ST2 is low, so the matching determiner 36 determines that the impedances match; if the output signal of the comparator 46 is at a low level, the amplitude level of the tone signal ST2 is high, so the matching determiner 36 determines that the impedances do not match.

When the matching determiner 36 determines, in step S7, that the impedances match ("Y" in step S8), if the frequency of the tone signal ST1 is not the maximum frequency fmax (e.g., 4000 [Hz]) ("N" in step S9), the frequency setter 31 sets the frequency of the tone signal ST1 to a frequency one step higher than the current frequency (step S10). At this time, the frequency setter 31 sets the frequency of the tone signal ST1 within the frequency range from the minimum frequency fmin to the maximum frequency fmax but outside a predetermined frequency range including the frequency (e.g., 400 [Hz]) of the dial tone signal transmitted by the switch 8. Then, the process proceeds to step S3.

If the frequency of the tone signal ST1 is the maximum frequency fmax (e.g., 4000 [Hz]) ("Y" in step S9), the impedance determiner 38 determines, as the terminal circuit to be used, the currently selected one of the terminal circuits 61 to 66 (step S11), and the process ends.

When the matching determiner 36 determines, in step S7, that the impedances do not match ("N" in step S8), if at least one of the terminal circuits 61 to 66 has not been selected ("N" in step S12), the impedance switching instruction unit 37 instructs the terminator 60 to select one of the terminal circuits 61 to 66 that has not been selected (step S13). Then, the process proceeds to step S2.

If all of the terminal circuits 61 to 66 have been selected ("Y" in step S12), the impedance determiner 38 determines the terminal circuit 61 as the terminal circuit to be used (step S14), and the process ends.

Hereinafter, the operation of the communication device 1 will be described more specifically using examples.

Figure 9:
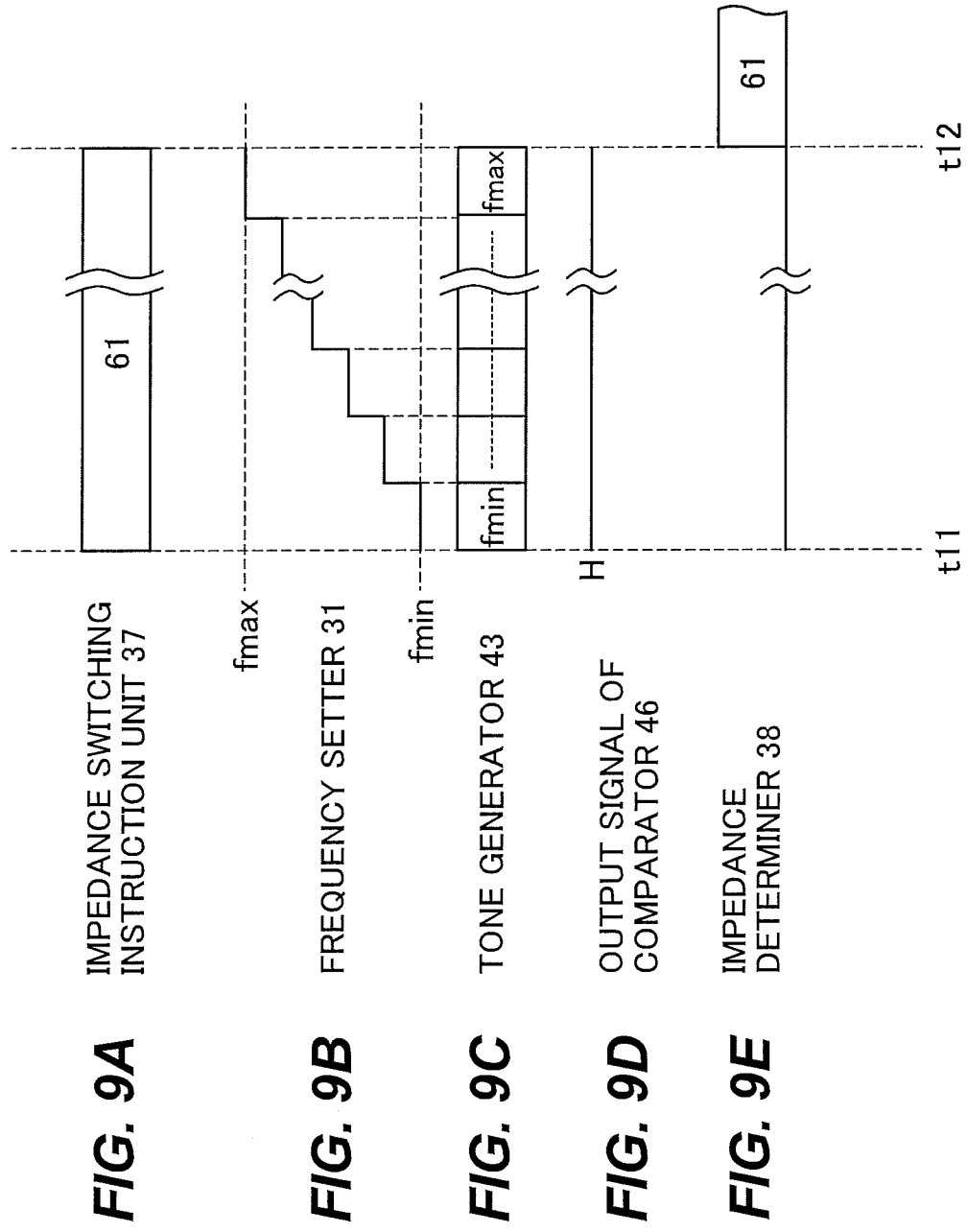
FIGS. 9A to 9E are timing diagrams illustrating an exemplary operation of the communication device according to the first embodiment.

FIGS. 9A to 9E illustrate the operation in a first case. The first case is a case where when the terminal circuit 61 is selected, it is determined that the impedances match. FIG. 9A illustrates the operation of the impedance switching instruction unit 37; FIG. 9B illustrates the operation of the frequency setter 31; FIG. 9C illustrates the operation of the tone generator 43; FIG. 9D illustrates the operation of the comparator 46; FIG. 9E illustrates the operation of the impedance determiner 38. In FIG. 9A, "61" indicates that the impedance switching instruction unit 37 instructs the terminator 60 to select the terminal circuit 61. In FIG. 9C, "fmin" indicates that the tone generator 43 generates a tone signal ST1 with the minimum frequency fmin, and "fmax" indicates that the tone generator 43 generates a tone signal ST1 with the maximum frequency fmax.

In this example, at time t11, the impedance switching instruction unit 37 instructs the terminator 60 to select the terminal circuit 61 (FIG. 9A, step S1), and in the time period from time t11 to time t12, the frequency setter 31 sequentially sets or changes the frequency of the tone signal ST1 within the frequency range from the minimum frequency fmin to the maximum frequency fmax (FIG. 9B, steps S2 and S10). In accordance with instructions from the frequency setter 31, the tone generator 43 generates and transmits a tone signal ST1 while sequentially varying the frequency (FIG. 9C, step S5). The comparator 46 compares the amplitude level of the tone signal ST2, which is caused by reflection of the tone signal ST1, with the threshold level Lth, and outputs the result of the comparison (FIG. 9D, step S6). Based on the result of the comparison, the matching determiner 36 determines whether the impedances match (step S7).

In this example, the output signal of the comparator 46 keeps at a high (H) level during the time period from time t11 to time t12. That is, in this example, the amplitude level of the tone signal ST2 is low. Accordingly, the matching determiner 36 determines that the impedances match.

Then, at time t12, the impedance determiner 38 determines the terminal circuit 61, which is currently selected, as the terminal circuit to be used (FIG. 9E, step S11).

FIGS. 10A to 10E illustrate the operation in a second case. The second case is a case where when the terminal circuit 61 is selected, it is determined that the impedances do not match, and when the terminal circuit 62 is selected, it is determined that the impedances match.

Figure 10:
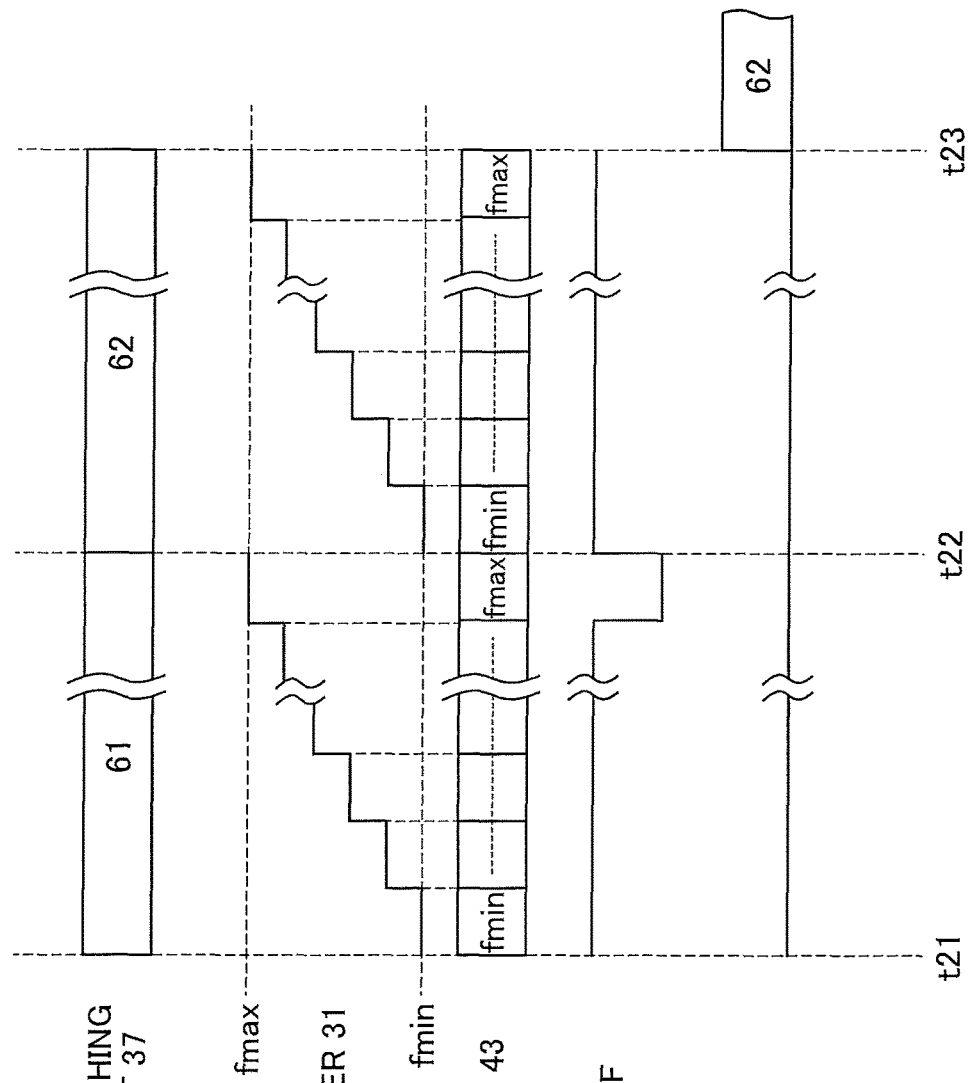
FIG. 10A to 10E are timing diagrams illustrating another exemplary operation of the communication device according to the first embodiment.

In this example, first, at time t21, the impedance switching instruction unit 37 instructs the terminator 60 to select the terminal circuit 61 (FIG. 10A, step S1). In the time period from time t21 to time t22, in accordance with instructions from the frequency setter 31, the tone generator 43 generates a tone signal ST1 while sequentially varying the frequency from the minimum frequency fmin to the maximum frequency fmax (FIGS. 10B and 10C, step S5). At this time, in this example, when the frequency of the tone signal ST1 is the maximum frequency fmax, the output signal of the comparator 46 is at a low level. That is, in this example, when the frequency of the tone signal ST1 is the maximum frequency fmax, the reflection is large and the amplitude level of the tone signal ST2 is high. Accordingly, the matching determiner 36 determines that the impedances do not match ("N" in step S8).

Next, at time t22, the impedance switching instruction unit 37 instructs the terminator 60 to select the terminal circuit 62 (FIG. 10A, step s13). In the time period from time t22 to time t23, in accordance with instructions from the frequency setter 31, the tone generator 43 generates a tone signal ST1 while sequentially varying the frequency from the minimum frequency fmin to the maximum frequency fmax (FIGS. 10B and 10C, step S5). In this example, the output signal of the comparator 46 keeps at a high (H) level during the time period from time t22 to time t23. Accordingly, the matching determiner 36 determines that the impedances match.

Then, at time t23, the impedance determiner 38 determines the terminal circuit 62, which is currently selected, as the terminal circuit to be used (FIG. 10E, step S11).

FIGS. 11A to 11E illustrate the operation in a third case. The third case is a case where when the terminal circuit 61 is selected, it is determined that the impedances do not match, and when the terminal circuit 62 is selected, it is determined that the impedances match, as in the second case.

Figure 11:
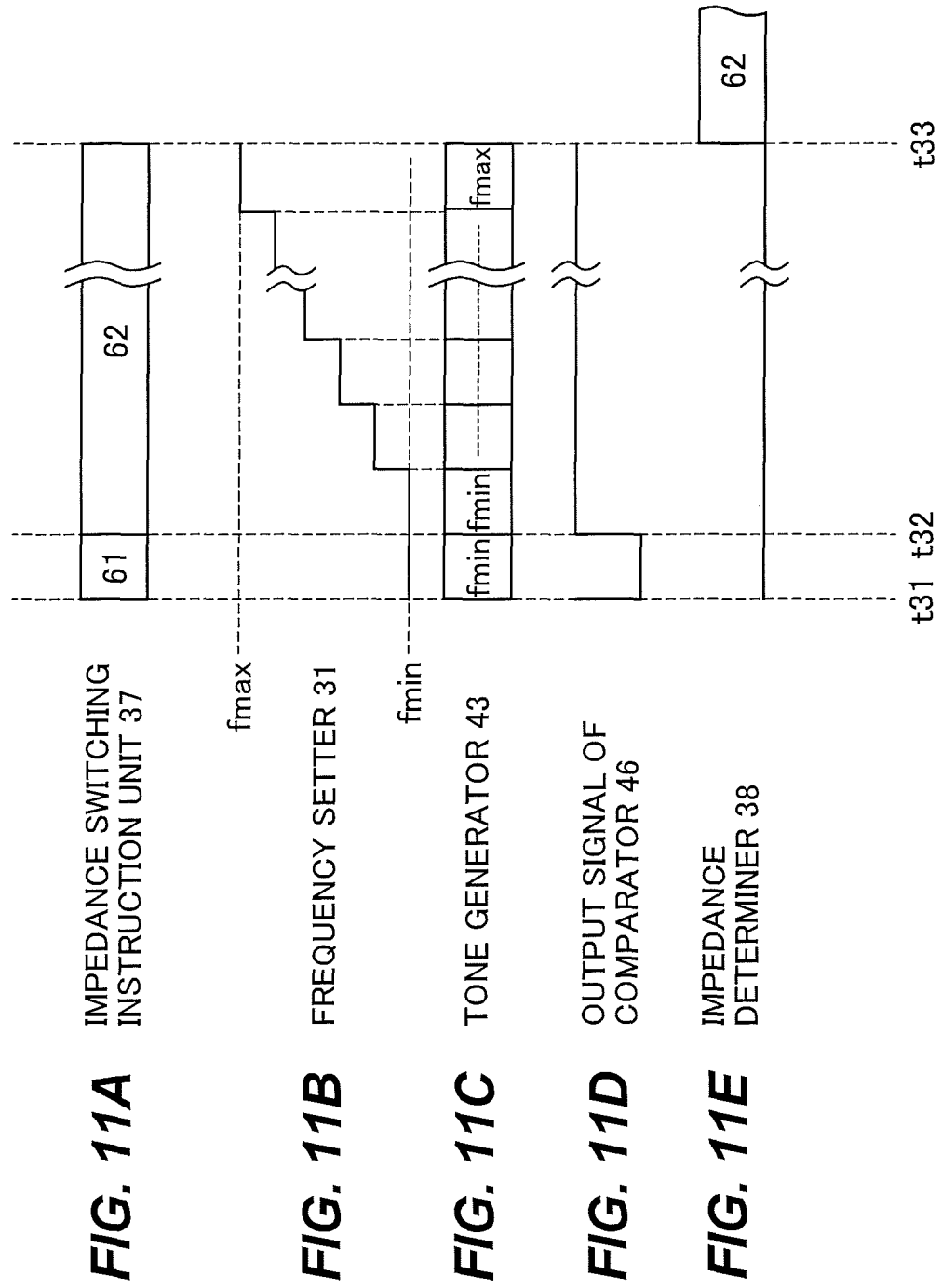
FIG. 11A to 11E are timing diagrams illustrating another exemplary operation of the communication device according to the first embodiment.

In this example, first, at time t31, the impedance switching instruction unit 37 instructs the terminator 60 to select the terminal circuit 61 (FIG. 11A, step S1). At time t31, in accordance with instructions from the frequency setter 31, the tone generator 43 generates a tone signal ST1 with the minimum frequency fmin (FIGS. 11B and 11C, steps S2 and S5). At this time, the output signal of the comparator 46 is at a low level. That is, in this example, when the frequency of the tone signal ST1 is the minimum frequency fmin, the reflection is large and the amplitude level of the tone signal ST2 is high. Accordingly, the matching determiner 36 determines that the impedances do not match ("N" in step S8).

Next, at time t32, the impedance switching instruction unit 37 instructs the terminator 60 to select the terminal circuit 62 (FIG. 11A, step S13). In the time period from time t32 to time t33, in accordance with instructions from the frequency setter 31, the tone generator 43 generates a tone signal ST1 while sequentially varying the frequency from the minimum frequency fmin to the maximum frequency fmax (FIGS. 11B and 11C, step S5). In this example, the output signal of the comparator 46 keeps at a high (H) level during the time period from time t32 to time t33. Accordingly, the matching determiner 36 determines that the impedances match.

Then, at time t33, the impedance determiner 38 determines the terminal circuit 62, which is currently selected, as the terminal circuit to be used (FIG. 11E, step S11).

FIGS. 12A to 12E illustrate the operation in a fourth case. The fourth case is a case where for each of the terminal circuits 61 to 66, when the terminal circuit is selected, it is determined that the impedances do not match.

Figure 12:
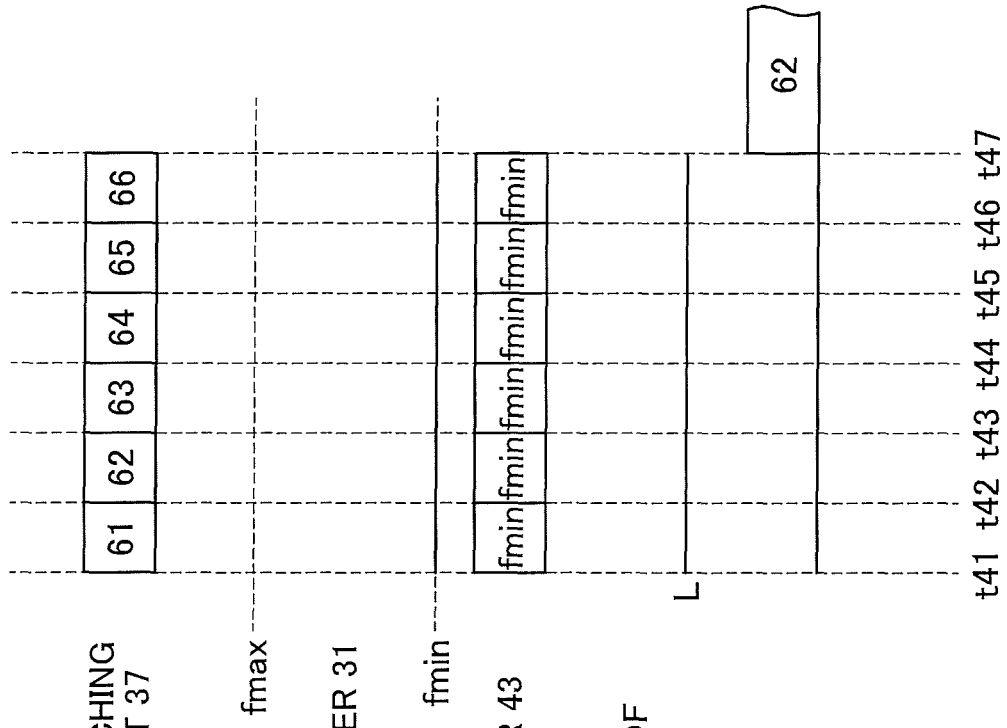
FIG. 12A to 12E are timing diagrams illustrating another exemplary operation of the communication device according to the first embodiment.

In this example, first, at time t41, the impedance switching instruction unit 37 instructs the terminator 60 to select the terminal circuit 61 (FIG. 12A, step S1). At time t41, in accordance with instructions from the frequency setter 31, the tone generator 43 generates a tone signal ST1 with the minimum frequency fmin (FIGS. 12B and 12C, steps S2 and S5). At this time, the output signal of the comparator 46 is at a low level. That is, in this example, when the frequency of the tone signal ST1 is the minimum frequency fmin, the reflection is large and the amplitude level of the tone signal ST2 is high. Accordingly, the matching determiner 36 determines that the impedances do not match ("N" in step S8).

Next, at time t42, the impedance switching instruction unit 37 instructs the terminator 60 to select the terminal circuit 62 (FIG. 12A, step S13), and the tone generator 43 generates a tone signal ST1 with the minimum frequency fmin in accordance with instructions from the frequency setter 31 (FIGS. 12B and 12C, steps S2 and S5). At this time, the output signal of the comparator 46 is at a low level. Accordingly, the matching determiner 36 determines that the impedances do not match ("N" in step S8).

The same applies to the time periods from time t43 to time t44, from time t44 to time t45, and from time t45 to time t46.

At time t46, the impedance switching instruction unit 37 instructs the terminator 60 to select the terminal circuit 66 (FIG. 12A, step S13), and the tone generator 43 generates a tone signal ST1 with the minimum frequency fmin in accordance with instructions from the frequency setter 31 (FIGS. 12B and 12C, steps S2 and S5). At this time, the output signal of the comparator 46 is at a low level. Accordingly, the matching determiner 36 determines that the impedances do not match ("N" in step S8).

Then, at time t47, the impedance determiner 38 determines the terminal circuit 61 as the terminal circuit to be used (FIG. 12E, step S14). That is, whichever of the terminal circuits 61 to 66 is selected, the impedances do not match, so the impedance determiner 38 determines the terminal circuit 61 as the terminal circuit to be used.

As above, the communication device 1 sequentially changes the terminal impedance by sequentially selecting the terminal circuits 61 to 66 and determines whether the impedances match. Thus, it is possible to determine a terminal impedance appropriate for the line impedance of the telephone line 7, thereby improving the communication quality.

Further, the communication device 1 sequentially varies the frequency of the tone signal ST1. Thus, it is possible to determine whether the impedances match in a wide frequency range, thereby improving the accuracy of the determination. As a result, the communication quality can be improved.

Further, since the communication device 1 can determine a terminal impedance appropriate for the line impedance of the telephone line 7 in this manner, there is no need to set the terminal impedance in advance when the communication device 1 is manufactured and shipped or when the communication device 1 is used by a user. Thus, it is possible to reduce the possibility of erroneous setting and improve user-friendliness.

Further, the communication device 1 determines, based on the reflection amount of the tone signal, whether the impedances match. This can simplify the configuration. For example, if the communication device is configured to determine, based on the transmission amount of a tone signal transmitted from the switch 8, whether the impedances match, the switch 8 needs to have a function of transmitting the tone signal while sequentially varying the frequency of the tone signal, for example. On the other hand, the communication device 1 according to this embodiment determines, based on the reflection amount of the tone signal ST1 transmitted by itself, whether the impedances match, so the switch 8 need not have a special function. This can simplify the configuration.

<Advantages>

As above, this embodiment sequentially changes the terminal impedance and determines whether the impedances match. This can improve the communication quality.

This embodiment sequentially changes the frequency of the tone signal and determines whether the impedances match. This can improve the communication quality.

This embodiment determines, based on the reflection amount of the tone signal, whether the impedances match. This can simplify the configuration.

<Modification Example>

In the above embodiment, as illustrated in step S14 of FIG. 8, in the case where the impedances do not match regardless of which of the terminal circuits 61 to 66 is selected, the terminal circuit 61 is determined as the terminal circuit to be used. However, alternatively, one of the terminal circuits 61 to 66 other than the terminal circuit 61 may be determined as the terminal circuit to be used, for example.

Second Embodiment

A communication device 2 according to a second embodiment will now be described. This embodiment causes the switch 8 to stop transmission of the dial tone signal before performing the operation for determining the terminal impedance. Parts that are substantially the same as those of the communication device 1 according to the first embodiment have the same reference characters, and descriptions thereof will be omitted appropriately.

As illustrated in FIG. 1, the communication device 2 includes a line controller 70. As illustrated in FIG. 2, the line controller 70 includes a communication controller 80. The communication controller 80 includes a matching controller 90. The matching controller 90 determines the terminal impedance so that the difference (or impedance difference) between the terminal impedance of the communication device 2 and the line impedance of the telephone line 7 is reduced (or small), similarly to the matching controller 30 in the first embodiment. The matching controller 90 also has a function of causing the switch 8 to stop transmission of the dial tone signal before performing the operation for determining the terminal impedance.

Figure 13:
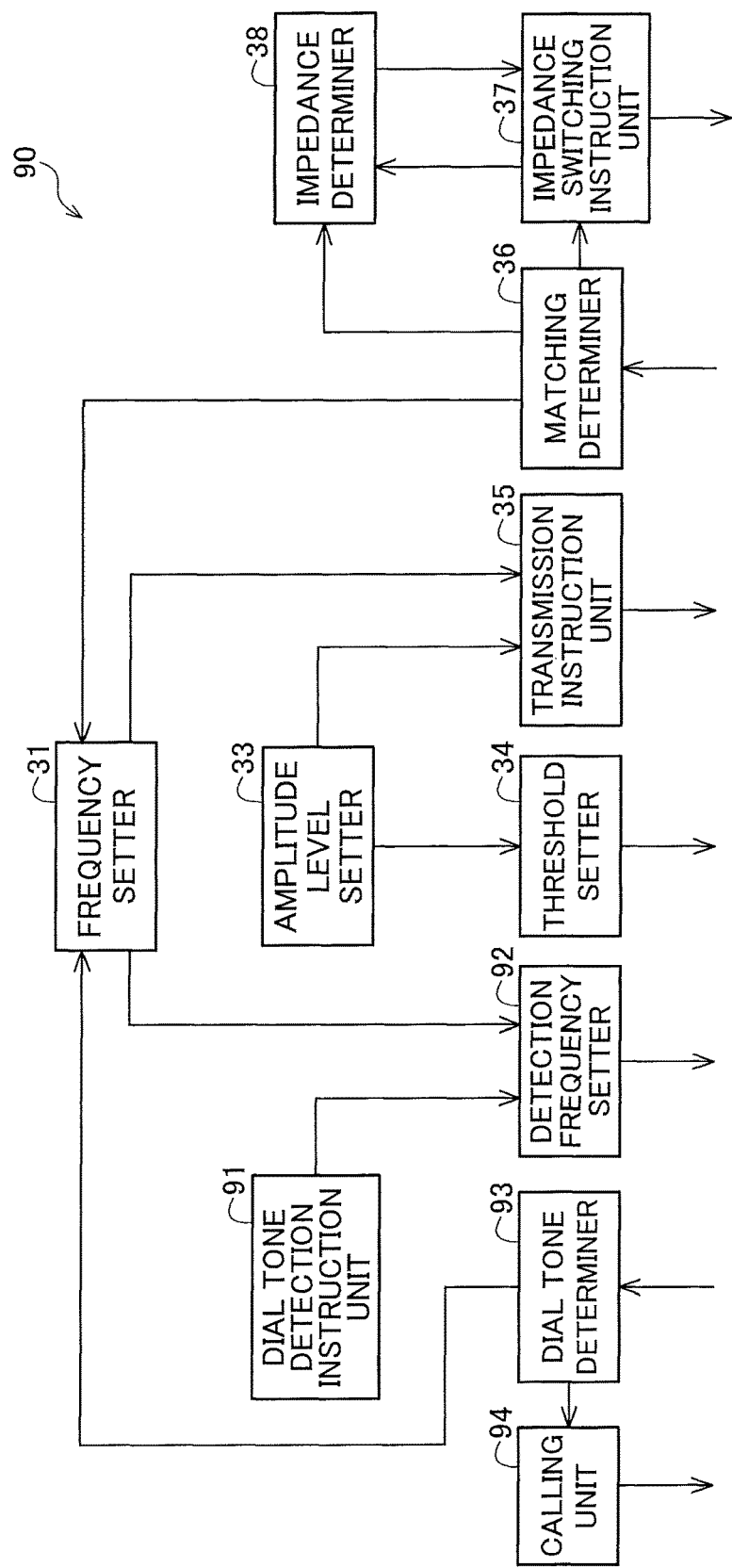
FIG. 13 is a block diagram illustrating an exemplary configuration of a matching controller of a second embodiment.

FIG. 13 illustrates an exemplary configuration of the matching controller 90. The matching controller 90 includes a dial tone detection instruction unit 91, a detection frequency setter 92, a dial tone determiner 93, and a calling unit 94.

The dial tone detection instruction unit 91 instructs the detection frequency setter 92 to set a frequency range for detecting a dial tone signal transmitted by the switch 8. In this example, the frequency of the dial tone signal is, for example, 400 [Hz].

The detection frequency setter 92 sets a frequency range (detection frequency range) within which detection is to be performed by the tone detector 44 of the modem 40, similarly to the detection frequency setter 32 in the first embodiment. The detection frequency setter 92 has also a function of, in accordance with an instruction from the dial tone detection instruction unit 91, sets the detection frequency range to a frequency range of, for example, ±10 [Hz] from the frequency of the dial tone signal.

The dial tone determiner 93 determines, based on a result of comparison by the comparator 46 of the modem 40, whether a dial tone signal is present on the telephone line 7. In some cases, the switch 8 intermittently transmits a dial tone signal. The dial tone determiner 93 can also perform the determination for such an intermittent dial tone signal. The dial tone determiner 93 notifies the calling unit 94 of the result of the determination.

The calling unit 94 selectively transmits a dial pulse signal or a dual tone multi-frequency (DTMF) signal via the modem 40 and line interface 50 on the basis of the result of the determination by the dial tone determiner 93. The calling unit 94 also has a function of, before transmitting the signal, performing line connection by causing the direct current signal holding unit 53 to operate, similarly to the connection controller 22.

Figure 14:
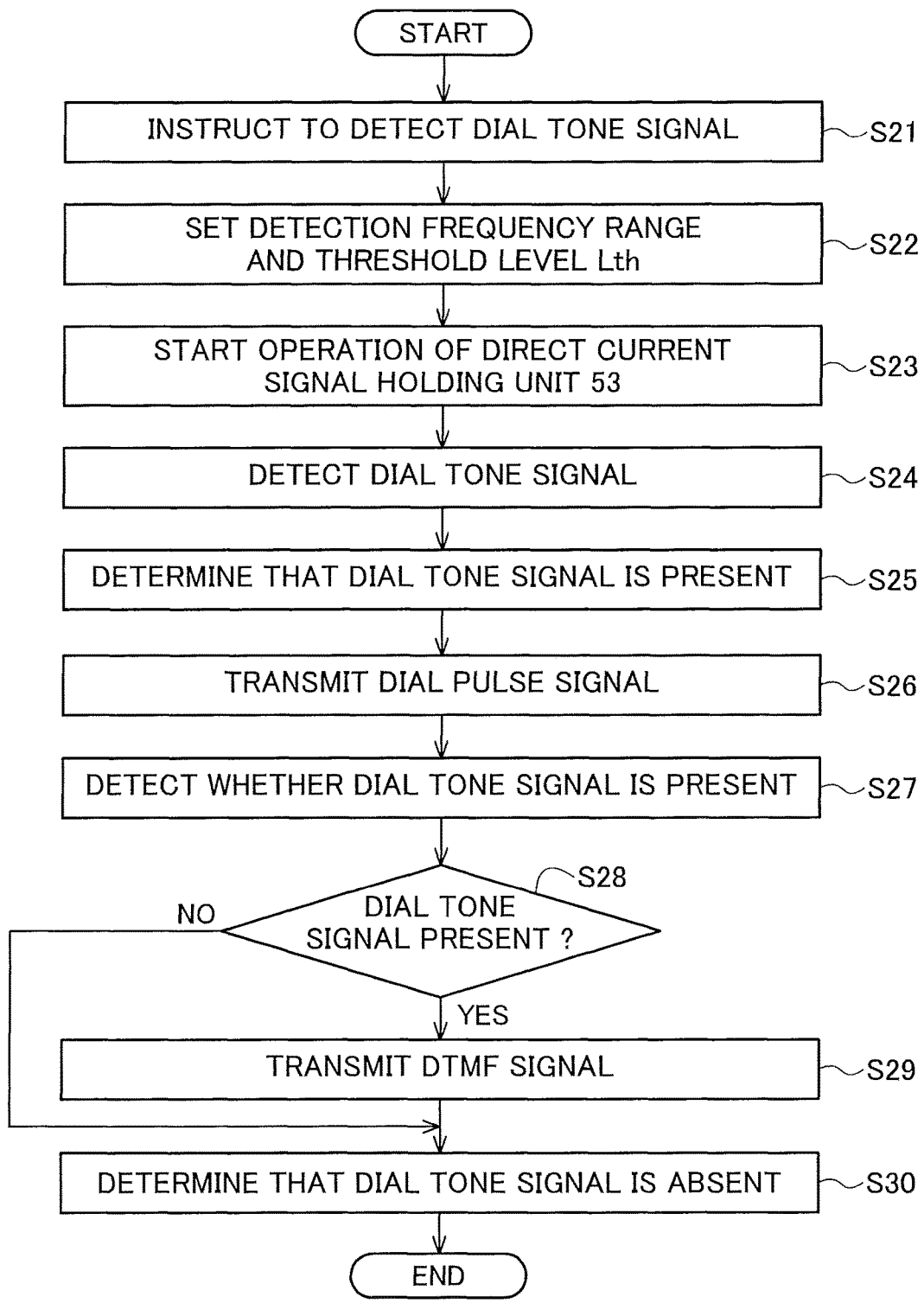
FIG. 14 is a flowchart illustrating an exemplary operation of a communication device according to the second embodiment.

FIG. 14 illustrates an exemplary operation of the communication device 2 for causing the switch 8 to stop transmission of the dial tone signal. In this example, the calling unit 94 causes the switch 8 to stop transmission of the dial tone signal by selectively transmitting a dial pulse signal or a DTMF signal. This operation will be described in detail below.

First, the dial tone detection instruction unit 91 instructs the detection frequency setter 92 to detect a dial tone signal (step S21).

Next, the detection frequency setter 92 sets the detection frequency range, and the threshold setter 34 sets the threshold level Lth (step S22). In this example, the detection frequency setter 92 sets the detection frequency range to a frequency range of, for example, ±10 [Hz] from the frequency (e.g., 400 [Hz]) of the dial tone signal; the threshold setter 34 sets the threshold level Lth to, for example, −30 [dBm].

Next, the calling unit 94 causes the direct current signal holding unit 53 to start operation (step S23), so that the communication device 2 is electrically connected to the telephone line 7. After that, the switch 8 transmits a dial tone signal to the communication device 2.

Next, the tone detector 44 detects the dial tone signal (step S24). Then, the tone detector 44 generates a signal Sig44 corresponding to the amplitude level of the dial tone signal. The comparator 46 compares the signal Sig44 output from the tone detector 44 with the threshold level Lth. The amplitude level of the dial tone signal is greater than the threshold level Lth, so the comparator 46 outputs a low (L) level signal.

Next, the dial tone determiner 93 determines, based on the result of the comparison supplied from the comparator 46, that a dial tone signal is present on the telephone line 7 (step S25).

Next, the calling unit 94 transmits a dial pulse signal (step S26). Then, the switch 8 receives the dial pulse signal. When the switch 8 has a function of stopping transmission of the dial tone signal in response to a dial pulse signal, it stops transmission of the dial tone signal in response to the dial pulse signal transmitted by the calling unit 94 in step S26. When the switch 8 has a function of stopping transmission of the dial tone signal in response to a DTMF signal, it keeps transmitting the dial tone signal.

Next, the dial tone determiner 93 determines, based on the result of the comparison supplied from the comparator 46, whether a dial tone signal is present on the telephone line 7 (step S27). If no dial tone signal is present ("N" in step S28), the process proceeds to step S30.

If the dial tone determiner 93 determines, in step S27, that a dial tone signal is present ("Y" in step S28), the calling unit 94 transmits a DTMF signal (step S29). Then, the switch 8 receives the DTMF signal. When the switch 8 has a function of stopping transmission of the dial tone signal in response to a DTMF signal, it stops transmission of the dial tone signal in response to the DTMF signal transmitted by the calling unit 94 in step S29.

Next, the dial tone determiner 93 determines, based on the result of the comparison supplied from the comparator 46, that no dial tone signal is present on the telephone line 7 (step S30), and the process ends.

After that, the communication device 2 determines the terminal impedance, as in the case of the first embodiment (FIG. 8). At this time, in step S10, the frequency setter 31 sets the frequency of the tone signal ST1 to a frequency one step higher than the current frequency within the frequency range from the minimum frequency fmin to the maximum frequency fmax. That is, in this embodiment, since transmission of the dial tone signal is stopped before determination of the terminal impedance, it is possible to use the entire frequency range from the minimum frequency fmin to the maximum frequency fmax. Thus, the communication device 2 can improve the accuracy of the determination as to whether the impedances match.

As above, this embodiment stops transmission of the dial tone signal before determination of the terminal impedance. This can improve the accuracy of the determination as to whether the impedances match, thereby improving the communication quality.

While the present invention has been described with reference to the embodiments and modification example, the present invention is not limited to them, and various modifications may be made.

For example, in the above embodiments, each time the communication device is electrically connected to the telephone line 7, it sets the terminal impedance. However, this is not mandatory, and the communication device may be configured as follows. When the communication device is electrically connected to the telephone line 7, it determines the terminal impedance; after that, when the communication device is electrically connected to the telephone line 7 again, it uses the previously determined terminal impedance.

Further, for example, in the above embodiments, the terminator 60 and interface 51 are configured by a silicon data access arrangement (DAA), but this is not mandatory. For example, the terminator 60 may be configured by using multiple transformers, and the terminal impedance may be set by selecting one of the multiple transformers.

Further, for example, in the above embodiments, the present invention is applied to a multi-function peripheral having functions, such as copying, facsimile, and scanning. However, this is not mandatory, and the present invention may be applied to other devices, such as facsimile machines, telephones, or modems. Further, it is possible to configure a network system in which at least one device, such as a multi-function peripheral, a facsimile machine, a telephone, or a modem, to which the present invention is applied is connected to another electronic device via a network, such as a local area network (LAN).

The above embodiments disclose:
1. A communication device (1, 2) comprising:
    a signal generator (43) configured to generate a first signal (ST1) and supply the first signal (ST1) to a telephone line (7);
    a terminator (60) having a variable terminal impedance as seen from the telephone line (7);
    a detector (44, 45, 46) configured to detect a difference between the terminal impedance and a line impedance of the telephone line (7); and
    a controller (30, 90) configured to determine the terminal impedance so that the difference is reduced.
2. The communication device (1, 2) of item 1, wherein the detector (44, 45, 46) detects the difference on a basis of a second signal (ST2) occurring on the telephone line (7) due to the first signal (ST1).
3. The communication device (1, 2) of item 2, wherein the second signal (ST2) occurs due to reflection of the first signal (ST1) by the telephone line (7).
4. The communication device (1, 2) of item 2 or 3, wherein the detector (44, 45, 46) determines, when an amplitude value of the second signal (ST2) is greater than a predetermined amplitude value, that the difference is great.
5. The communication device (1, 2) of any one of items 2 to 4, wherein while the controller (30, 90) sets the terminal impedance to a first terminal impedance and sequentially varies a frequency of the first signal (ST1) to different frequencies, the detector (44, 45, 46) detects the difference at each of the different frequencies on a basis of the second signal (ST2).
6. The communication device (1, 2) of item 5, wherein when the difference is great, while the controller (30, 90) sets the terminal impedance to a second terminal impedance and sequentially varies the frequency of the first signal (ST1) to different frequencies, the detector (44, 45, 46) detects the difference at each of the different frequencies on a basis of the second signal (ST2).
7. The communication device (1, 2) of item 5, wherein when the difference at each of the different frequencies is small, the controller (30, 90) determines the first terminal impedance as the terminal impedance.
8. The communication device (1, 2) of any one of items 5 to 7, wherein the controller (30, 90) sequentially varies the frequency of the first signal (ST1) within a first frequency range.
9. The communication device (2) of item 8, wherein:
    the first signal (ST1) is a tone signal, and
    the signal generator (43) further generates a dial pulse signal or a DTMF signal, thereby causing a communication partner (8) to stop generation of a dial tone signal, and then the controller (90) sequentially varies the frequency of the first signal (ST1).
10. The communication device (1) of item 8, wherein the controller (30) sequentially varies the frequency of the first signal (ST1) within the first frequency range but outside a second frequency range.
11. The communication device (1) of item 10, wherein:
    the first signal (ST1) is a tone signal, and
    the second frequency range corresponds to a frequency of a dial tone signal generated by a communication partner (8).
12. The communication device (1, 2) of any one of items 1 to 11, wherein:
    the terminator (60) includes a plurality of terminal circuits (61-66) having different impedances, and
    the controller (30, 90) determines the terminal impedance by selecting one of the plurality of terminal circuits (61-66).
13. The communication device (1, 2) of any one of items 1 to 12, wherein the terminator (60) is configured by a silicon data access arrangement.
14. The communication device (1, 2) of any one of items 1 to 12, wherein the terminator (60) includes a plurality of transformers.

15. The communication device (1, 2) of any one of items 1 to 14, wherein the communication device (1, 2) is a facsimile machine.

The above embodiments further disclose:
1. A communication device (1, 2) for communication via a telephone line (7), comprising:
a terminator (60) for terminating the telephone line (7), the terminator (60) having a variable terminal impedance as seen from the telephone line (7);
a transmitter (43) configured to transmit a first signal (ST1) to the telephone line (7);
a detector (44, 45, 46, 36) configured to detect a second signal (ST2) occurring on the telephone line (7) due to the first signal (ST1) and determine, on a basis of the detected second signal (ST2), whether the terminal impedance matches a line impedance of the telephone line (7); and
a controller (30, 90) configured to determine the terminal impedance so that the detector determines that the terminal impedance matches the line impedance.
2. The communication device (1, 2) of item 1, wherein the second signal (ST2) occurs due to reflection of the first signal (ST1) by the telephone line (7).
3. The communication device (1, 2) of item 1 or 2, wherein the detector (44, 45, 46, 36) determines, when an amplitude value of the second signal (ST2) is less than a predetermined amplitude value, that the terminal impedance matches the line impedance.
4. The communication device (1, 2) of any one of items 1 to 3, wherein the controller (30, 90) sets the terminal impedance to a first terminal impedance and sequentially varies a frequency of the first signal (ST1) to different frequencies, and for each of the different frequencies, the detector (44, 45, 46, 36) detects the second signal (ST2) and determines, on a basis of the detected second signal (ST2), whether the terminal impedance matches the line impedance.
5. The communication device (1, 2) of item 4, wherein when the detector (44, 45, 46, 36) determines, for at least one of the different frequencies, that the terminal impedance does not match the line impedance, the controller (30, 90) changes the terminal impedance to a second terminal impedance and sequentially varies the frequency of the first signal (ST1) to different frequencies, and for each of the different frequencies, the detector (44, 45, 46, 36) detects the second signal (ST2) and determines, on a basis of the detected second signal (ST2), whether the terminal impedance matches the line impedance.
6. The communication device (1, 2) of item 4, wherein when the detector (44, 45, 46, 36) determines, for each of the different frequencies, that the terminal impedance matches the line impedance, the controller (30, 90) determines the first terminal impedance as the terminal impedance.
7. The communication device (1, 2) of any one of items 4 to 6, wherein the controller (30, 90) sequentially varies the frequency of the first signal (ST1) within a first frequency range.
8. The communication device (2) of item 7, wherein:
the communication device (2) is connected to a communication partner (8) via the telephone line (7), the communication partner (8) transmitting a dial tone signal to the communication device (2),
the first signal (ST1) is a tone signal, and
before transmitting the first signal (ST1) to the telephone line (7), the transmitter (43) transmits a dial pulse signal or a DTMF signal to the communication partner (8), thereby causing the communication partner (8) to stop transmission of the dial tone signal.
9. The communication device (1) of item 7, wherein the controller (30) sequentially varies the frequency of the first signal (ST1) within the first frequency range but outside a second frequency range.
10. The communication device (1) of item 9, wherein:
the communication device (1) is connected to a communication partner (8) via the telephone line (7), the communication partner (8) transmitting a dial tone signal to the communication device (1),
the first signal (ST1) is a tone signal, and
the second frequency range corresponds to a frequency of the dial tone signal transmitted by the communication partner (8).
11. The communication device (1, 2) of any one of items 1 to 10, wherein:
the terminator (60) includes a plurality of terminal circuits (61-66) having different impedances, and
the controller (30, 90) determines the terminal impedance by selecting one of the plurality of terminal circuits (61-66).
12. The communication device (1, 2) of any one of items 1 to 11, wherein the terminator (60) is configured by a silicon data access arrangement.
13. The communication device (1, 2) of any one of items 1 to 11, wherein the terminator (60) includes a plurality of transformers.
14. The communication device (1, 2) of any one of items 1 to 13, wherein the communication device (1, 2) is a facsimile machine.

The above embodiments further disclose:
1. A communication device (1, 2) for communication via a telephone line (7), comprising:
a terminator (60) for terminating the telephone line (7), the terminator (60) having a variable terminal impedance;
a transmitter (43) connected to the telephone line (7) via the terminator (60) and configured to transmit a first signal (ST1) to the telephone line (7);
a detector (44, 45, 46) connected to the telephone line (7) via the terminator (60) and configured to receive a second signal (ST2) caused by reflection of the first signal (ST1) from the telephone line (7) and detect a magnitude of the second signal (ST2); and
a controller (30, 90) configured to adjust the terminal impedance on a basis of the detected magnitude.
2. The communication device (1, 2) of item 1, wherein the controller (30, 90) adjusts the terminal impedance so that the detected magnitude is less than a predetermined threshold.

What is claimed is:
1. A communication device for communication via a telephone line, comprising:
a terminator for terminating the telephone line, the terminator having a variable terminal impedance as seen from the telephone line;
a transmitter configured to transmit a first signal to the telephone line;
a detector configured to detect a second signal occurring on the telephone line due to the first signal, and to determine, based on the detected second signal, whether the terminal impedance matches a line impedance of the telephone line; and
a controller configured to set the terminal impedance so that the detector determines that the terminal impedance matches the line impedance, wherein the controller sets the terminal impedance to a first terminal impedance and sequentially varies a frequency of the first signal to different frequencies, and for each of the different frequencies, the detector detects the second signal and determines, on a basis of the detected second signal, whether the terminal impedance matches the line impedance, and wherein when the detector determines, for at least one of the different frequencies, that the terminal impedance does not match the line impedance, the controller changes the terminal impedance to a second terminal impedance and sequentially varies the frequency of the first signal to different frequencies, and for each of the different frequencies, the detector detects the second signal and determines, on a basis of the detected second signal, whether the terminal impedance matches the line impedance.

2. The communication device of claim 1, wherein the second signal occurs due to reflection of the first signal by the telephone line.

3. The communication device of claim 1, wherein the detector determines, when an amplitude value of the second signal is less than a predetermined amplitude value, that the terminal impedance matches the line impedance.

4. The communication device of claim 1, wherein when the detector determines, for each of the different frequencies, that the terminal impedance matches the line impedance, the controller determines the first terminal impedance as the terminal impedance.

5. The communication device of claim 1, wherein the controller sequentially varies the frequency of the first signal within a first frequency range.

6. The communication device of claim 5, wherein:
the communication device is connected to a communication partner via the telephone line, the communication partner transmitting a dial tone signal to the communication device,
the first signal is a tone signal, and
before transmitting the first signal to the telephone line, the transmitter transmits a dial pulse signal or a DTMF signal to the communication partner, thereby causing the communication partner to stop transmission of the dial tone signal.

7. The communication device of claim 5, wherein the controller sequentially varies the frequency of the first signal within the first frequency range but outside a second frequency range.

8. The communication device of claim 7, wherein:
the communication device is connected to a communication partner via the telephone line, the communication partner transmitting a dial tone signal to the communication device,
the first signal is a tone signal, and
the second frequency range corresponds to a frequency of the dial tone signal transmitted by the communication partner.

9. The communication device of claim 1, wherein:
the terminator includes a plurality of terminal circuits having different impedances, and
the controller determines the terminal impedance by selecting one of the plurality of terminal circuits.

10. The communication device of claim 1, wherein the terminator is configured by a silicon data access arrangement.

11. The communication device of claim 1, wherein the terminator includes a plurality of transformers.

12. The communication device of claim 1, wherein the communication device is a facsimile machine.

* * * * *